United States Patent
alOmani

(10) Patent No.: US 8,887,404 B1
(45) Date of Patent: Nov. 18, 2014

(54) METHOD AND APPARATUS FOR DISPLAYING THE DIRECTION OF MECCA ON A WALL OR CORNER OF A ROOM

(71) Applicant: Jasem Mohammad Ali Rashed alOmani, Kuwait (KW)

(72) Inventor: Jasem Mohammad Ali Rashed alOmani, Kuwait (KW)

(*) Notice: Subject to any disclaimer, the term of this patent is extended or adjusted under 35 U.S.C. 154(b) by 0 days.

(21) Appl. No.: 14/274,793

(22) Filed: May 12, 2014

(51) Int. Cl.
*A47G 33/00* (2006.01)
*G01C 17/04* (2006.01)
*G01C 17/20* (2006.01)

(52) U.S. Cl.
CPC ............. *A47G 33/008* (2013.01); *G01C 17/20* (2013.01)
USPC .............. 33/349; 33/1 CC; 116/200; 434/245

(58) Field of Classification Search
CPC ..... A47G 33/00; A47G 33/008; G01C 17/04; G01C 17/10; G01C 21/02; G08B 5/00; G08B 5/02
USPC ...... 116/1, 200, 205, 209, 327; 33/1 CC, 1 H, 33/227, 228, 283, 286, 349, 354, 404, 33/407; 434/72, 75, 78, 245; 52/103, 105
See application file for complete search history.

(56) References Cited

U.S. PATENT DOCUMENTS

| 4,054,000 | A | * | 10/1977 | Lisle ............................. 40/124.5 |
| 4,372,052 | A | | 2/1983 | Wakim |
| 4,525,821 | A | * | 6/1985 | Garcia ........................ 369/30.02 |
| 4,597,554 | A | | 7/1986 | James |
| 5,438,781 | A | * | 8/1995 | Landmann ....................... 40/584 |
| 5,598,381 | A | | 1/1997 | Bornand et al. |
| 5,721,713 | A | | 2/1998 | Bornand |
| 5,724,910 | A | * | 3/1998 | Annesley et al. ............. 116/209 |
| 5,894,674 | A | * | 4/1999 | Feldman ......................... 33/354 |

(Continued)

FOREIGN PATENT DOCUMENTS

| CH | 607904 A | * | 12/1978 | ............. A47C 16/04 |
| DE | 20120752 U1 | * | 5/2002 | ............. A63H 13/20 |

(Continued)

OTHER PUBLICATIONS

Derwent 2013-X41576 abstract of MY 125726 A, titled "Prayer altar structure for use in house, has stepped element which is positioned at edge of side support supporting horizontal board such that horizontal surface of prayer altar is extended", published Aug. 30, 2006, Inventor: Yong Y P, Assignee: Yong Y P[Yongi].*

*Primary Examiner* — R. A. Smith
(74) *Attorney, Agent, or Firm* — Lowe Hauptman & Ham LLP

(57) ABSTRACT

A method and apparatus for indicating the direction of Mecca on a wall or corner of a room includes the step of using a compass and directional cards to determine the actual direction of Mecca from a specific location. A second step includes providing a three-dimensional support member defining a pair of parallel generally horizontal planar surfaces with a quadrilateral cross sectional shape including a pair of 90° angles and an obtuse angle of about 120° and an acute angle of about 60°. In addition, an apparatus includes means for attaching the support member to a wall or corner of a room so that an outer surface of said support member is perpendicular or approximately perpendicular to the direction toward Mecca and providing an arrow and fixing said arrow pointing in the direction of Mecca on an underside of one of the parallel surfaces.

7 Claims, 2 Drawing Sheets

(56) References Cited

U.S. PATENT DOCUMENTS

| | | | |
|---|---|---|---|
| 6,005,482 A | 12/1999 | Moran et al. | |
| 6,202,035 B1 | 3/2001 | Lameer | |
| 6,633,813 B1 | 10/2003 | Deworetzki | |
| 6,798,349 B1 | 9/2004 | Richley et al. | |
| 7,134,213 B1 * | 11/2006 | Ashin | 33/355 R |
| 7,841,292 B2 * | 11/2010 | Halberg et al. | 116/205 |
| 7,914,285 B2 * | 3/2011 | Boney | 434/72 |

FOREIGN PATENT DOCUMENTS

| | | | | |
|---|---|---|---|---|
| FR | 2638860 A1 * | 5/1990 | | G04B 23/00 |
| FR | 2866704 A1 * | 8/2005 | | G01C 17/02 |
| JP | 3149499 U * | 4/2009 | | A47G 33/00 |

\* cited by examiner

METHOD AND APPARATUS FOR DISPLAYING THE DIRECTION OF MECCA ON A WALL OR CORNER OF A ROOM

FIELD OF THE INVENTION

This invention relates to a method and apparatus for displaying the direction of Mecca on the wall or corner of a room for use by Muslims during prayers.

BACKGROUND FOR THE INVENTION

Muslims throughout the world participate in daily prayers five times a day. The timing for these prayers are spaced fairly evenly so that an individual is reminded of God and given an opportunity to seek God's guidance and forgiveness. The followers of Islam are generally called to face Mecca during such prayers.

In Arabic countries, hotel rooms and in some public rooms an arrow that points in the direction of Mecca is displayed. However, an increase in international business and travel has led to a need for an improved method and apparatus for displaying the direction of Mecca.

There have been a number of prior art patents directed to methods and devices for indicating the direction to a predetermined locale. For example, a U.S. Pat. No. 4,372,052 of Wakim. As disclosed therein, a direction indicating device with an azimuth card which is positioned upon a compass. The card is provided with a number of indicia marks corresponding to specific geographic locations. An adjustable straight-line cursor is positioned to be aligned with an indicia marking corresponding to the geographic location at which the device is being used and with the pivot point of the compass magnetic needle such that when the compass magnetic needle is pointing to magnetic North, the straight-line cursor will indicate the true direction of the predetermined locale from that specific geographic location.

A more recent U.S. Pat. No. 5,598,381 of Bornand et al., discloses a Method for Taking Directions and Timepiece Intended to Make Use of This Method. As disclosed, in the method for providing direction the longitude of the place where one is situated on the surface of the earth is determined by comparing the local time with the time of a reference time zone, and the latitude of the place where on is situated is determined by measuring the inclination of the earth's magnetic field in relation to the horizontal.

Finally, a U.S. Pat. No. 6,633,813 of Deworetzki, discloses a Navigation System for Supplementary Representation of Directional Information. The system relates to a navigation system for a land vehicle having a measuring arrangement for supplying position, direction and/or distance data, having a data source arrangement for supplying navigation data, having an input arrangement at least for inputting a destination, having a control arrangement at least for determining a route, and having at least one display apparatus for outputting navigation instructions. To free the driver from other actions diverting his attention from the traffic, the control arrangement determines a direction from the calculated position of the land vehicle and a stored position for a prescribed place. The display apparatus additionally displays the direction ascertained by the control arrangement.

Notwithstanding the above, it is presently believed that there is a current need and a potential market for an improved method and apparatus for displaying the directing of Mecca in accordance with the present invention.

BRIEF SUMMARY OF THE INVENTION

In essence the present invention contemplates a method for displaying or indicating the direction of Mecca on a wall or corner of a room for use by Muslims during prayers. The method comprises or consists of the following steps.

The first step is to determine the correct or accurate direction of Mecca from a wall or corner of a room at a distance from Mecca;

A second step calls for providing a three dimensional support member that defines a pair of parallel generally horizontal planar surfaces having a quadrilateral shape that includes a pair of right angles, an obtuse angle and an acute angle.

In addition, a third step includes attaching the support member to a wall or corner of a room so that an outer surface of the support member is approximately perpendicular to the direction toward Mecca.

Finally, a fourth step calls for providing an arrow or planar copy of an arrow and fixing the arrow pointing in the direction of Mecca to the underside of the lower of said pair of horizontal surfaces.

A second embodiment of the invention contemplates an apparatus for displaying the direction of Mecca on a wall or corner of a room. The apparatus comprises or consists of a compass and a directory for indicating the direction of Mecca from various international cities and/or directions from magnetic north from various locations in the world.

The apparatus also comprises or consists of a three-dimensional support member including a pair of parallel generally horizontal planar surfaces with a quadrilateral cross sectional shape that defines a pair of right angles, an obtuse angle and an acute angle.

In addition, the apparatus in accordance with the preferred embodiment of the invention includes means for attaching the support member to the wall or corner of a room so that the outer surface of the support member is approximately perpendicular to the direction toward Mecca. In the preferred embodiment of the invention the attachment to a wall or corner of a room is modified so that the outer surface of the support member is perpendicular to the direction toward Mecca.

Finally, an arrow is attached to the underside of the lower of the parallel planar surfaces.

The invention will now be described in connection with the accompanying drawings wherein like reference numerals have been used to identify like parts.

DETAILED DESCRIPTION OF THE PREFERRED EMBODIMENTS OF THE INVENTION

Figure 1:
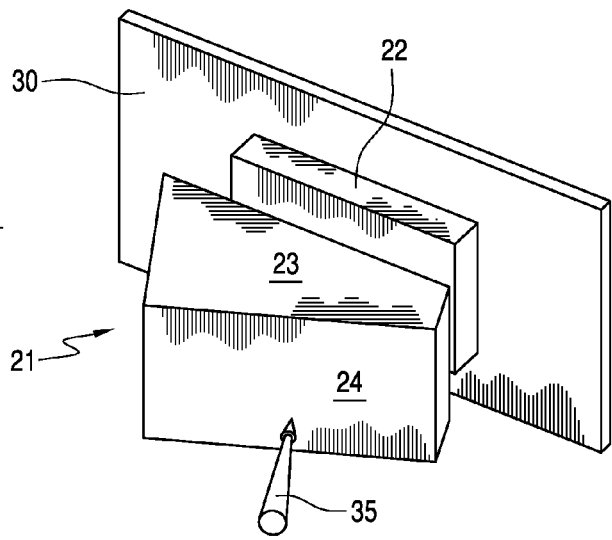
FIG. 1 is a perspective exploded view of a support member used in a preferred embodiment of the invention.

Referring now to FIG. 1, a key element in an apparatus incorporated in the present invention resides in a three dimensional (3D) six-sided support member 21 which is illustrated on a wall 30. The support member 21 includes a base member 22 which is fixed to the wall 30 in an upper portion thereof. The base member 22 is fixed to the wall 30 by any conventional means such as screws, nails, or adhesives.

Figure 2:
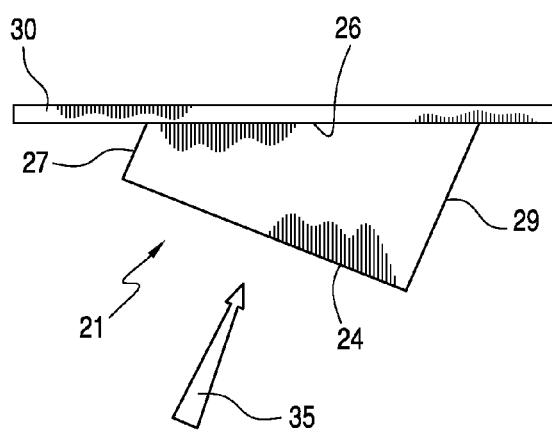
FIG. 2 is a top or plan view of a support member as shown in FIG. 1 as installed on a wall in a room.

The support member 21 includes a first planar surface 24 defined by four right angles forming a rectangular or square shape disposed generally vertically or along a vertical axis. As shown in FIG. 2, the support member 21 includes a second vertical surface 26 that is shown in FIG. 2 as in contact with a wall 30 of a room.

The vertical surface 26 defines the longest or diagonal surface that connects the obtuse and acute angles defined by the cross sectional shape of the support member 21. As defined by the pair of right angels, the vertical walls also define a relatively short vertical surface 27 and a relatively large vertical surface 29. Further, a pair of parallel generally horizontal planar surfaces 23 and 25 provide a fifth and a sixth wall of the support member 21.

Figure 3:
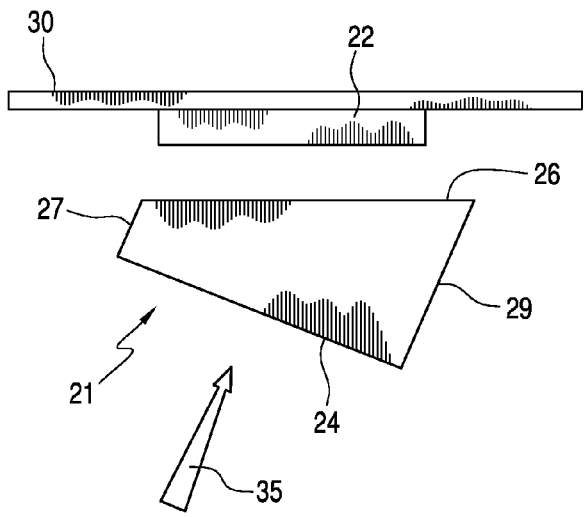
FIG. 3 is a top or plan exploded view of FIG. 1.
Figure 4:
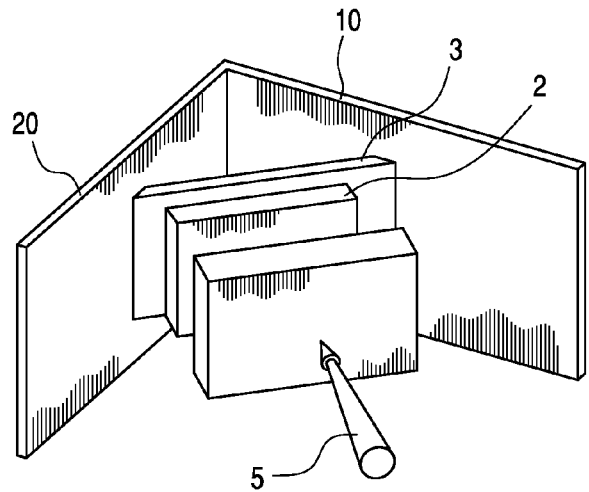
FIG. 4 is a perspective exploded view of the invention for corner installation.
Figure 5:
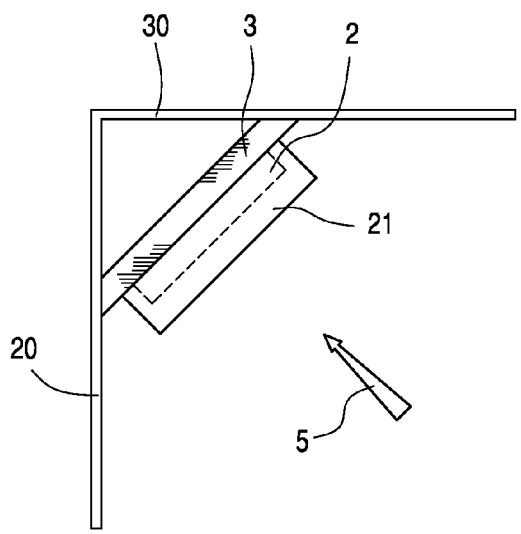
FIG. 5 is a top or plan view of a support member as used in a corner of a room.
Figure 6:
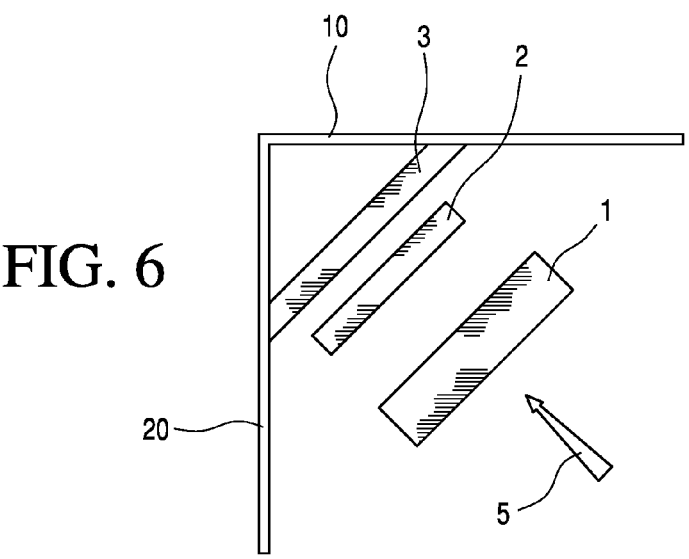
FIG. 6 is an exploded plan view of a support member as used in a corner of a room.

As illustrated in FIGS. 1-3 the base member 22 may be recessed in the diagonal surface 26 but is usually used to apply thickness to provide substance for attaching the support member to a wall of a room as for example by nails, screws or adhesives. Nevertheless, it is also contemplated that the base member may extend beyond the boundary of a so-called diagonal surface defined by the vertical surfaces 24, 27 and 29.

It is further contemplated that the support member 21 can be rotated about a horizontal axis to provide an outer surface that is approximately perpendicular to the direction of Mecca. Along this line, it is contemplated to have a plurality of support members wherein the obtuse angle and the acute angle are different so that the outer surface of the apparatus is actually perpendicular to the direction of Mecca and wherein the arrow is displayed with a perpendicular line. Such changes could also be made by a series of angular wedges.

The present invention is a three-dimensional wall mounted sign board to indicate the direction of Qibla (Holy Ka-Aba) in Mecca in the Kingdom of Saudi Arabia. The support member can be made from hard cardboard or other plastic, wood or composite materials.

The support member is installed on a wall or corner of a prayer room with an arrow pointing in the direction of the Holy Ka-Aba.

In any room there are three location possibilities for installing the apparatus namely, a corner adjacent to the wall or another wall adjacent to the corner. The installation process starts by measuring the deflection angle 5 for the direction to Mecca then referring to Appendix 1. In a first illustrated example, the deflection angle 5 is between 30° and −30° so that the installation can be done on the wall according to the following.

a) installing the base on the wall;
b) trim the board 1 from the back by the same angle as the deflection angle;
c) install the board 1 on the base 2; and
d) install the sticker 4 on the board 1.

In case 2 the deflection angle 5 is between 30° and 60° or −30° and −60°. For this range the installation can only be done on a corner according to the following.

a) move to an adjacent corner;
b) install the corner base 3 on the corner;
c) install the base 2 on the corner base 3;
d) trim the board 1 from the back to an angle equal to the positive difference between the deflection angle 5 and 45°;
e) install the board 1 on the base 2; and
f) install an arrow indication on the board 1.

In case 3 the deflection angle 5 is more than 60° installation therefore the installation can be performed on an adjacent wall as in case 1.

While the invention has been described in connection with the above-identified preferred embodiments, it should be recognized and understood that changes and modifications may be made therein without departing from the scope of the appended claims.

What is claimed is:

1. A method for displaying an indication of the direction of Mecca on a wall or corner of a room for use by Muslims during prayers, said method comprising:
    determining a correct direction of Mecca from a wall or corner of a room at a distance from Mecca;
    providing a three-dimensional support member defining a pair of parallel generally horizontal planar surfaces having a quadrilateral cross sectional shape defining a pair of 90° angles, an obtuse angle and an acute angle;
    attaching said support member to a wall or corner of a room so that an outer surface of said support member is approximately perpendicular to the direction toward Mecca;
    providing an arrow and fixing the arrow pointing in the direction of Mecca to the underside of said lower of said pair of horizontal surfaces.

2. The method for displaying an indication of the direction of Mecca on a wall or corner of a room for use by Muslims during prayers according to claim 1, in which said obtuse angle is between 105° and 135° and said acute angle is between 45° and 75°.

3. The method for displaying an indication of the direction of Mecca on a wall or corner of a room for use by Muslims during prayers according to claim 2, in which the obtuse angle is about 120° and the acute angle is about 60°.

4. The method for displaying an indication of the direction of Mecca on a wall or corner of a room for use by Muslims during prayers according to claim 1, in which the obtuse angle and the acute angle are modified so that the outer surface of said support member is perpendicular to the direction of Mecca.

5. A method for displaying an indication of the direction of Mecca on a wall or corner of a room for use by Muslims during prayers, said method consisting of:
    determining a correct direction of Mecca from a wall or corner of a room at a distance from Mecca;
    providing a three-dimensional support member defining a pair of parallel generally horizontal planar surfaces having a four-sided quadrilateral cross sectional shape defining a pair of 90° angles, an obtuse angle of about 120° and an acute angle of about 60°;
    attaching said support member to a wall or corner of a room so that an outer surface of said support member is approximately perpendicular to the direction to Mecca;
    providing a directional arrow and fixing said arrow pointing in the direction of Mecca to the underside of the lower of said pair of horizontal planar surfaces.

6. An apparatus for displaying the direction of Mecca on a wall or corner of a room, said apparatus comprising:
    a compass for indicating magnetic north and a direction for indicating the direction of Mecca from various international cities or deviations from magnetic north from various locations in the world;
    a three-dimensional support member including a pair of parallel generally horizontal planar surfaces with a quadrilateral cross sectional shape defining a pair of 90° angles, an obtuse angle and an acute angle;
    means for attaching said support member to a wall or corner of a room so that an outer surface of said support member is approximately perpendicular to the direction to Mecca; and, an arrow or a printed copy of an arrow pointing or a photo at Ka-Aba to the direction of Mecca on an underside of the lower of the parallel surfaces.

7. An apparatus for displaying the direction of Mecca on a wall or corner of a room, said apparatus consisting of:

a compass, a directional indicator and plurality of azimuth cards wherein each card represents a particular geographic region includes a plurality of indicia markings on each card corresponding to specific geographic locations in the region, said azimuth cards each having an opening therein to accommodate the magnetic needle when the card is positioned on the compass such that each card is selectively positionable on said compass in a predetermined relationship to said magnetic needle corresponding to the specific geographic location at which the device is being used with respect to a north south reference means for orienting said azimuth card on said compass with respect to said magnetic needle;

a three-dimensional support member including a pair of parallel generally horizontal planar surfaces with a quadrilateral cross sectional shape defining a pair of 90° angles, an obtuse angle of about 120° and an acute angle of about 60°;

means for attaching said support member to a wall or corner of a room so that an outer surface of said support member is approximately perpendicular to the direction towards Mecca; and, providing an arrow and fixing said arrow or a printed copy of an arrow pointing to the direction of Mecca on an underside of the lower of the parallel surfaces.

* * * * *